(12) United States Patent
Katou

(10) Patent No.: US 10,415,698 B2
(45) Date of Patent: Sep. 17, 2019

(54) HYDRAULIC CONTROL CIRCUIT

(71) Applicant: JATCO Ltd, Fuji-shi, Shizuoka (JP)

(72) Inventor: Katsuo Katou, Tokyo (JP)

(73) Assignee: JATCO LTD, Fuji-Shi (JP)

(*) Notice: Subject to any disclaimer, the term of this patent is extended or adjusted under 35 U.S.C. 154(b) by 41 days.

(21) Appl. No.: 15/560,667

(22) PCT Filed: Feb. 3, 2016

(86) PCT No.: PCT/JP2016/053168
§ 371 (c)(1),
(2) Date: Sep. 22, 2017

(87) PCT Pub. No.: WO2016/152261
PCT Pub. Date: Sep. 29, 2016

(65) Prior Publication Data
US 2018/0112771 A1 Apr. 26, 2018

(30) Foreign Application Priority Data
Mar. 26, 2015 (JP) .................................. 2015-063581

(51) Int. Cl.
*F16H 61/14* (2006.01)
*F15B 11/10* (2006.01)
*F15B 21/041* (2019.01)
*F16H 61/02* (2006.01)

(52) U.S. Cl.
CPC .............. *F16H 61/14* (2013.01); *F15B 11/10* (2013.01); *F15B 21/041* (2013.01); *F16H 61/029* (2013.01); *F16H 61/0267* (2013.01); *F16H 61/0276* (2013.01); *F15B 2211/465* (2013.01);
(Continued)

(58) Field of Classification Search
CPC ..... F16H 61/14; F16H 61/0267; F16H 61/029
See application file for complete search history.

(56) References Cited

U.S. PATENT DOCUMENTS 3,171,433 A * 3/1965 Borman, Jr. .......... F16H 61/029
137/116.3
3,580,112 A * 5/1971 Dach ..................... F16H 61/029
477/128
(Continued)

FOREIGN PATENT DOCUMENTS

JP H08-098464 A 4/1996

*Primary Examiner* — Stacey A Fluhart
(74) *Attorney, Agent, or Firm* — Foley & Lardner LLP

(57) ABSTRACT

A hydraulic control circuit includes a first pressure regulating valve for regulating a pump discharge pressure, a second pressure regulating valve for adjusting a pilot pressure to a torque converter pressure, and a first oil passage that connects an output port of the first pressure regulating valve and a torque-converter input-side oil passage, the second pressure regulating valve having an input port connected to the first oil passage through a second oil passage, a drive port connected to the first oil passage through a third oil passage, a spool axially displaced according to a drive pressure inputted into the drive port for regulating the torque converter pressure, and an output port. A throttle is provided between the connection section of the first and third oil passages and the connection section of the first and second oil passages, for adjusting the torque converter pressure to an appropriate pressure.

4 Claims, 5 Drawing Sheets

(52) U.S. Cl.
CPC ..... *F15B 2211/56* (2013.01); *F15B 2211/615* (2013.01); *F16H 2061/0279* (2013.01)

(56) References Cited

U.S. PATENT DOCUMENTS 3,941,016 A * 3/1976 Will .................... F16H 61/0021
477/159
4,298,109 A * 11/1981 Dorpmund ............. F16H 61/20
192/221

* cited by examiner

HYDRAULIC CONTROL CIRCUIT

TECHNICAL FIELD

The present invention relates to a hydraulic control circuit.

BACKGROUND ART

An automatic transmission for a vehicle is provided with a hydraulic control circuit that supplies hydraulic pressure (oil) used for driving and/or cooling the transmission (for instance, see Patent document 1).

Referring now to FIG. 5, there is shown an explanatory drawing illustrating part of the essential circuit configuration (essential circuit components) of a hydraulic control circuit of an automatic transmission for a vehicle of a conventional example.

A hydraulic control circuit 400 of an automatic transmission for a vehicle shown in FIG. 5a is provided with a pressure adjusting valve 410 for adjusting a discharge pressure of an oil pump OP to a line pressure P1. A pressure regulating valve 420 is provided downstream of the pressure adjusting valve 410, for regulating a supply pressure (torque converter pressure P2) to a torque converter T/C (not shown).

In the hydraulic control circuit 400, a flow control valve 430 is also provided in an oil passage 500 that connects the oil pump OP and the pressure adjusting valve 410, for adjusting the flow of oil to the pressure adjusting valve 410. The flow control valve serves to return part of oil discharged from the oil pump OP back to the upstream side of oil pump OP during driving of oil pump OP at high rotational speeds, for preventing excessive hydraulic pressure from being supplied to the pressure adjusting valve 410.

The aforementioned flow control valve 430 has a throttle (a flow constriction) 431 provided in the oil passage 500, a bypass passage 432 that connects the upstream side and downstream side of throttle 431, while bypassing the throttle 431, and a connecting passage 434 that connects the bypass passage 432 and the upstream side of oil pump OP. When an excessive hydraulic pressure acts on the flow control valve 430, a valve element 435, which is disposed in the bypass passage 434, moves to a position at which the bypass passage 432 and the connecting passage 434 are communicated with each other. Thus, part of the hydraulic pressure acting on the flow control valve 430 is returned back to the upstream side of oil pump OP, for preventing the excessive hydraulic pressure from being supplied to the pressure adjusting valve 410.

By the way, with the throttle 431 provided in the oil passage 500, the throttle 431 serves as a flow resistance that impedes the flow of oil. As a result, the load on the oil pump OP increases, thereby deteriorating fuel economy. For the reasons discussed above, in recent years, there have been proposed various hydraulic control circuits in which a flow control valve 430 has been omitted or eliminated (see FIG. 5b).

However, assuming that the flow control valve 430 has been eliminated, there is a tendency for excessive hydraulic pressure to be supplied to the pressure adjusting valve 410 during driving of oil pump OP at high rotational speeds. In this case, the pilot pressure P3, which is supplied from the pressure adjusting valve 410 to the pressure regulating valve 420, also tends to increase (see FIG. 5b).

By way of the pressure regulating valve 420, the drain amount of oil drained from the pressure regulating valve 420 is adjusted, thus regulating a hydraulic pressure (torque converter pressure P2) supplied to the torque converter side. However, as the pilot pressure P3 acting on the pressure regulating valve 420 increases, the torque converter pressure P2 also increases. Assuming that the increased torque converter pressure P2 reaches a withstand pressure of the torque converter or more, the increased torque converter pressure affects the durability of the torque converter.

In such a case, for the purpose of a drop of hydraulic pressure inputted to the pressure regulating valve 420, a throttle (a flow constriction) may be provided between the pressure adjusting valve 410 and the pressure regulating valve 420. However, the pressure regulating valve 420 utilizes the hydraulic pressure inputted from the pressure adjusting valve 410 as a drive pressure P4 of the pressure regulating valve 420 (see FIG. 5b). Hence, assuming that the pilot pressure P3 inputted into the pressure regulating valve 420 has been simply dropped without much deliberation, there is a possibility that the operation of pressure regulating valve 420 cannot be appropriately performed. In this case, the torque converter pressure P2 cannot be adjusted to an appropriate pressure.

Therefore, it would be desirable to permit the torque converter pressure to be adjusted to an appropriate pressure even when a flow control valve has been eliminated.

CITATION LIST

Patent Literature

Patent document 1: Japanese Patent Provisional Publication No. JPH08-98464 (A)

SUMMARY OF INVENTION

In the present invention, a hydraulic control circuit is provided with a first pressure regulating valve for regulating a discharge pressure of an oil pump, a second pressure regulating valve for adjusting an output hydraulic pressure of the first pressure regulating valve to a supply pressure to an input-side oil passage of a hydraulic drive device which is hydraulically controlled, and a first oil passage that connects an output port of the first pressure regulating valve and the input-side oil passage, the second pressure regulating valve having an input port connected to a connection section of the first oil passage and the input-side oil passage through a second oil passage, a drive port connected to the first oil passage through a third oil passage, a valve element axially displaced according to a drive pressure inputted into the drive port, and an output port, and the second pressure regulating valve being configured to regulate the supply pressure by controlling a flow rate between the input port and the output port of the second pressure regulating valve by the valve element axially displaced according to the drive pressure applied at the drive port. A connection section of the first oil passage and the third oil passage is provided on a side of the first pressure regulating valve from the connection section of the first oil passage and the second oil passage, and a throttle is provided in the first oil passage between the connection section of the first oil passage and the second oil passage and the connection section of the first oil passage and the third oil passage.

According to the invention, the throttle, which is provided in the first oil passage, serves as a resistance that results in a pressure loss in hydraulic pressure flowing through the first oil passage, and hence the hydraulic pressure in the first oil passage on the side of the hydraulic drive device from the throttle becomes lower than the hydraulic pressure in the first oil passage on the side of the first pressure regulating valve. Accordingly, even when the output hydraulic pressure from the output port of the first pressure regulating valve becomes greater, it is possible to favorably effectively prevent the hydraulic pressure supplied to the input-side oil passage of the hydraulic drive device from becoming excessive owing to the increased output hydraulic pressure of the first pressure regulating valve.

Additionally, the third oil passage is connected to the first oil passage on the side of the first pressure regulating valve, and thus the output hydraulic pressure of the first pressure regulating valve is directly applied to the drive port of the second pressure regulating valve. Hence, even with the throttle provided in the first oil passage, it is possible to appropriately drive the second pressure regulating valve by virtue of the hydraulic pressure of a high pressure level before passing through the throttle.

DESCRIPTION OF EMBODIMENTS

Embodiment

Hereinafter explained is a hydraulic control circuit 1 of the embodiment.

Figure 1A:
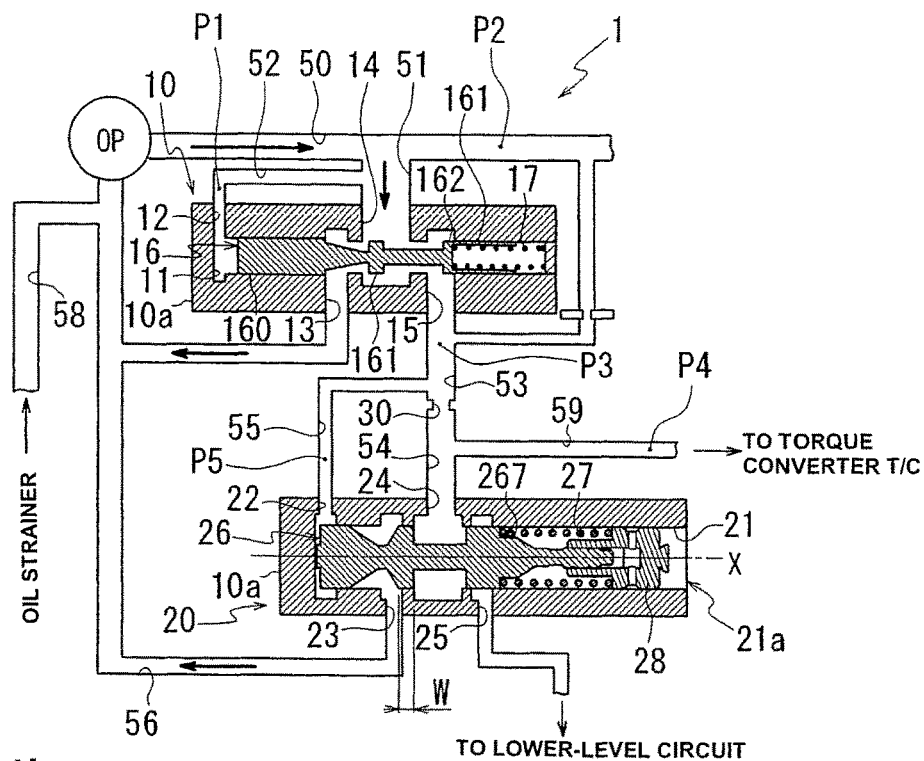
FIG. 1 is an explanatory drawing illustrating a hydraulic control circuit of an embodiment.
Figure 1B:
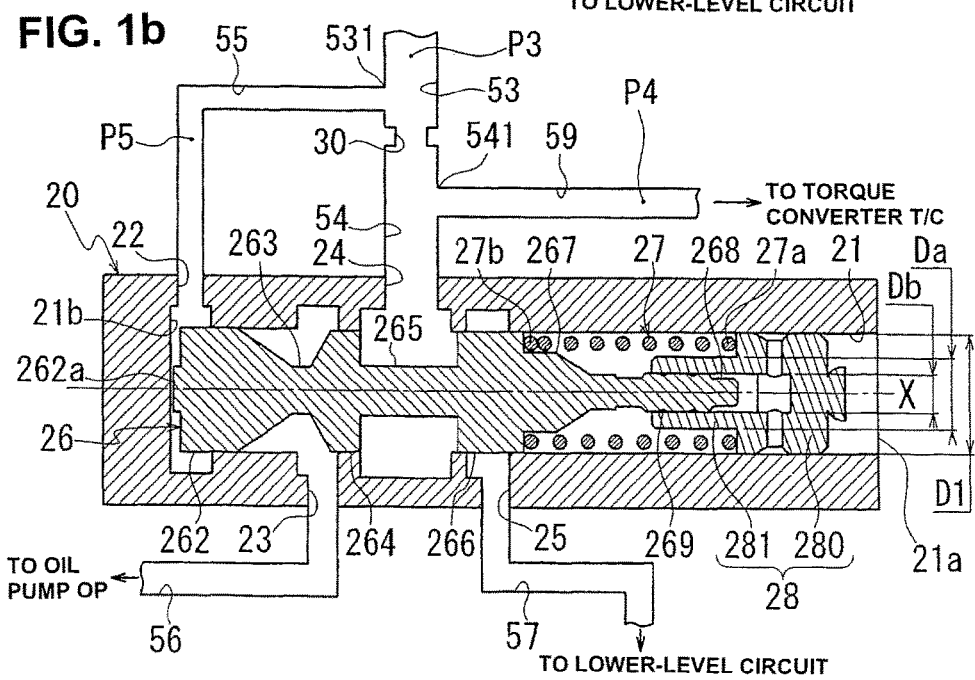

Referring to FIG. 1, there is shown an explanatory drawing illustrating the hydraulic control circuit 1 of the embodiment. Hereupon, FIG. 1a is an explanatory drawing illustrating the essential circuit configuration of the hydraulic control circuit 1, whereas FIG. 1b is an enlarged view in and around a pressure regulating valve 20 shown in FIG. 1a in a state where a spool 26 of pressure regulating valve 20 is positioned at its initial position.

In the following description, the terms "upstream side" and "downstream side" are explained and used in terms of the direction of flow of oil discharged from an oil pump OP.

As shown in FIG. 1a, a pressure adjusting valve 10 is provided in the hydraulic control circuit 1, for adjusting a discharge pressure of oil pump OP to a line pressure P2. The pressure regulating valve 20 is provided downstream of the pressure adjusting valve 10, for regulating a supply pressure (torque converter pressure P4) to an oil passage 59, which is connected to an apply-pressure adjustment port of a torque converter T/C (not shown).

Pressure adjusting valve 10 has a bottomed cylindrical spool bore 11 formed in a valve body 10a, and a spool 16 movably disposed in the spool bore 11 such that the spool is movable forward and backward in the axial direction.

A spring 17, which is axially positioned in the spool bore 11, is in abutted-engagement with one end of spool 16. Thus, spool 16 is forced toward the side (the left-hand side in the drawing) of a drive pressure port 12 opening into the other end of spool bore 11, by a biasing force applied from the spring 17 to the spool.

Therefore, when there is no supply of discharge pressure of oil pump OP to the pressure adjusting valve 10, spool 16 is positioned at the initial position at which a first large-diameter portion 160 of the other end side of the spool has been brought into abutted-engagement with the other end of the spool bore 11.

The drive pressure port 12, an exhaust port 13, an input port 14, and an output port 15 are open into the inner periphery of spool bore 11, in that order, from the other end side of the spool bore.

In a state where spool 16 is positioned at the initial position, fluid-communication between the input port 14 and the exhaust port 13 is blocked by a second large-diameter portion 161 of spool 16, and fluid-communication between the input port 14 and the output port 15 is simultaneously blocked by a third large-diameter portion 162 of spool 16. Hence, any of ports, which are open to the spool bore 11, are not communicated with each other.

The input port 14 of pressure adjusting valve 10 is connected through an oil passage 51 to an oil passage 50 that connects the oil pump OP and a hydraulic circuit of the side of pulleys (not shown). The drive pressure port 12 is connected to the middle of the oil passage 51 through an oil passage 52.

Hence, when the discharge pressure of oil pump OP is supplied to the pressure adjusting valve 10, hydraulic pressure introduced through the drive pressure port 12 is applied against the first large-diameter portion 160 of spool 16. Spool 16 moves to the right in the drawing, while compressing the spring 17 by the hydraulic pressure acting on the first large-diameter portion 160.

Spool 16 is configured such that its displacement to the right varies according to the discharge pressure of oil pump OP. When spool 16 is displaced to the right in the drawing, first of all, a blocked state of fluid-communication between the input port 14 and the output port 15, blocked by the third large-diameter portion 162, is released. Hence, the hydraulic pressure (pilot pressure P3), which has a pressure value determined based on a displacement of spool 16, is outputted from the output port 15.

Accordingly, within the pressure adjusting valve 10, a flow rate between the input port 14 and the output port 15 is controlled by means of the spool 16 axially displaced according to the drive pressure applied at the drive pressure port 12, thereby permitting the pilot pressure P3 to be adjusted.

When the discharge pressure of oil pump OP further increases, within the pressure adjusting valve 10 a blocked state of fluid-communication between the input port 14 and the exhaust port 13, blocked by the second large-diameter portion 161, is released. Hence, the hydraulic pressure, which has a pressure value determined based on a displacement of spool 16, is returned from the exhaust port 13 back to the oil pump OP.

An oil passage 53, which is connected to the output port 15, is configured to connect the output port 15 of pressure adjusting valve 10 and the input-side oil passage 59 of the torque converter T/C (not shown). The previously-discussed pressure regulating valve 20 is connected to the downstream side of oil passage 53 through an oil passage 54, for adjusting an output hydraulic pressure of the pressure adjusting valve 10 (i.e., the output port 15) to a torque converter pressure P4 supplied to the input-side oil passage 59 of the torque converter T/C.

Next, details of pressure regulating valve 20 are hereunder explained.

In a similar manner to the pressure adjusting valve 10, as shown in FIG. 1a the pressure regulating valve 20 has a spool 26 axially movably disposed in a bottomed cylindrical spool bore 21 formed in the valve body 10a.

As shown in FIG. 1b, the spool bore 21 is shaped into a straight bore extending along an axis X. One end of spool bore 21 is formed as an insertion opening 21a through which the spool 26 is inserted.

Spool 26, which has been inserted into the spool bore 21, is structured to have a first large-diameter portion 262, a first small-diameter portion 263, a second large-diameter portion 264, a second small-diameter portion 265, a third large-diameter portion 266, a spring-guide portion 267, and a shaft portion 268, in that order, from its top end side. The shaft portion 268 of spool 26 is movably supported by a supporting member 28, which has been press-fitted into the spool bore 21, in a manner so as to be movable forward and backward in the direction of axis X.

The aforementioned supporting member 28 has a basal end portion 280 press-fitted into the spool bore 21 and a cylindrical hollow spring supporting portion 281. The supporting member is fixed to the spool bore such that the supporting member is not movable in the axial direction of axis X in a state where the spring supporting portion 281 is directed toward the other end side (the left-hand side in the drawing) of spool bore 21.

Spring supporting portion 281 has an outside diameter Da less than an inside diameter D1 of spool bore 21. An opening diameter Db of the opening of spring supporting portion 281 is configured or dimensioned to be conformable to the outside diameter of the shaft portion 268 of spool 26.

A spring 27 is inserted around the outside of spring supporting portion 281. One end 27a of spring 27 is in abutted-engagement with the basal end portion 280 in the axial direction of axis X for positioning of spring 27 in the direction of axis X.

The shaft portion 268 of spool 26 is inserted into the spring supporting portion 281 in the axial direction of axis X, such that the spool 26 is movably supported by the supporting member 28 in a manner so as to be movable forward and backward in the axial direction of axis X.

The shaft portion 268 is formed in the outer periphery with grooves 269 around the entire circumference in the circumferential direction about the axis X. The grooves 269 are formed as a plurality of grooves spaced away from each other at regular intervals in the axial direction of axis X.

By virtue of the provision of such grooves, it is possible to reduce the sliding resistance to sliding motion of the shaft portion 268 of spool 26 inside of the spring supporting portion 281 in the direction of axis X.

The other end 27b of spring 27 is in abutted-engagement with the third large-diameter portion 266 formed adjacent to the spring-guide portion 267 in the axial direction of axis X. Spool 26 is forced toward the other end side (the left-hand side in the drawing) of spool bore 21 by a biasing force applied from the spring 27 to the third large-diameter portion 266.

Therefore, the biasing force of spring 27 is permanently applied to the spool 26 installed in the spool bore 21. In a state where there is no supply of hydraulic pressure from the pressure adjusting valve 10 to the pressure regulating valve 20, the first large-diameter portion 262 of spool 26 is positioned at its initial position at which a central protruding portion 262a, which axially extends from the center of the first large-diameter portion, has been brought into abutted-engagement with a wall section 21b of spool bore 21.

Each of the first large-diameter portion 262, the second large-diameter portion 264, and the third large-diameter portion 266 of spool 26 is configured to have an outside diameter conformable to the inside diameter D1 of spool bore 21. Each of the first small-diameter portion 263 and the second small-diameter portion 265 of spool 26 is configured or dimensioned to have an outside diameter less than the inside diameter D1 of spool bore 21.

As shown in FIG. 1b, a drive pressure port 22, an exhaust port 23, an input port 24, and an output port 25 are open into the inner periphery of spool bore 21, in that order, from the other end side (the wall section 21b).

The drive pressure port 22 is configured to be open at a given position adjacent to the wall section 21b of spool bore 21, in a manner so as to permit hydraulic pressure to be supplied into a clearance defined between the protruding portion 262a of the first large-diameter portion 262 and the wall section 21b of spool bore 21 with the spool 26 positioned at its initial position.

Exhaust port 23 is configured to open at a given position conformable to the first small-diameter portion 263 with the spool 26 positioned at its initial position. Input port 24 is configured to open at a given position conformable to the second small-diameter portion 265 with the spool 26 positioned at its initial position. Output port 25 is configured to open at a given position conformable to the third large-diameter portion 266 with the spool 26 positioned at its initial position.

Therefore, in a state where spool 26 is positioned at the initial position, fluid-communication between the input port 24 and the output port 25 is blocked by the third large-diameter portion 266 of spool 26, and fluid-communication between the input port 24 and the exhaust port 23 is blocked by the second large-diameter portion 264 of spool 26. Hence, any of ports, which are open to the spool bore 21, are not communicated with each other.

An oil passage 55, which is connected at one end to the drive pressure port 22, is also connected at the other end to the oil passage 53 that connects the pressure adjusting valve 10 and the torque converter T/C (not shown) on the side of pressure adjusting valve 10 from the oil passage 54 connected to the input port 24.

A throttle 30, which is formed to partly narrow a flow passage cross-sectional area of oil passage 53, is provided in the oil passage 53 between the connection section 531 of oil passages 53 and 55 and the connection section 541 of oil passages 53 and 54.

Hence, the hydraulic pressure (i.e., pilot pressure P3) in the oil passage 53 on the upstream side of throttle 30 (that is, on the side of pressure adjusting valve 10) becomes higher than the hydraulic pressure in the oil passage 54 on the downstream side of throttle 30 (that is, on the side of the torque converter not shown).

An oil passage 57, which is connected to the output port 25, is connected to the input side of a lower-level circuit (not shown) located downstream of the pressure regulating valve 20. On the other hand, an oil passage 56, which is connected to the exhaust port 23, is also connected to an oil passage 58 (see FIG. 1a), through which the oil pump OP is connected to an oil strainer.

The operation and action of pressure regulating valve 20 is hereunder explained in detail.

Figure 2A:
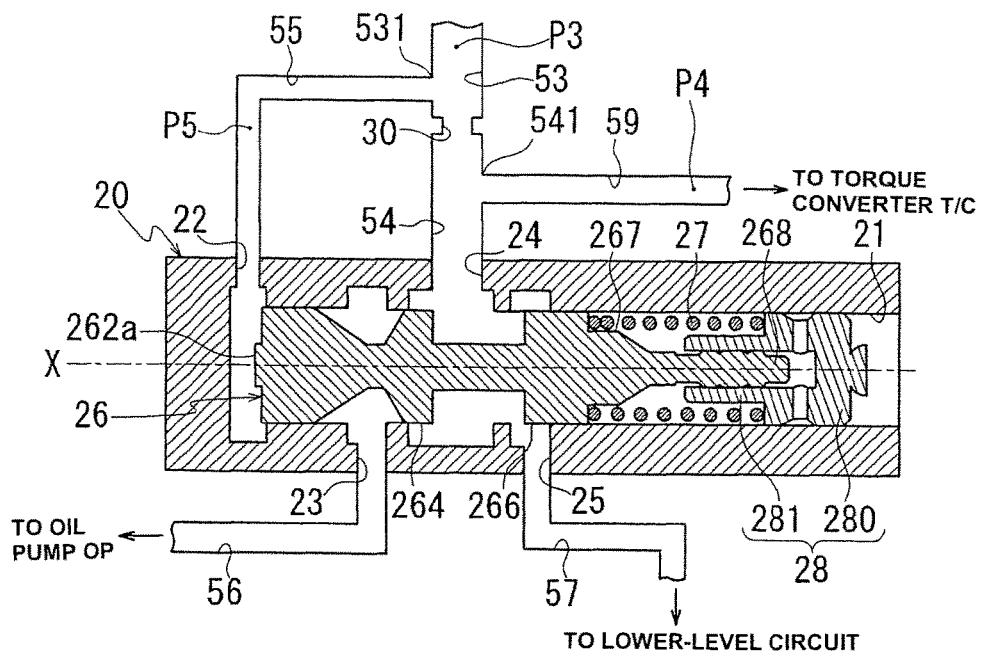
FIG. 2 is a cross-sectional view illustrating the operation of a pressure regulating valve.
Figure 2B:
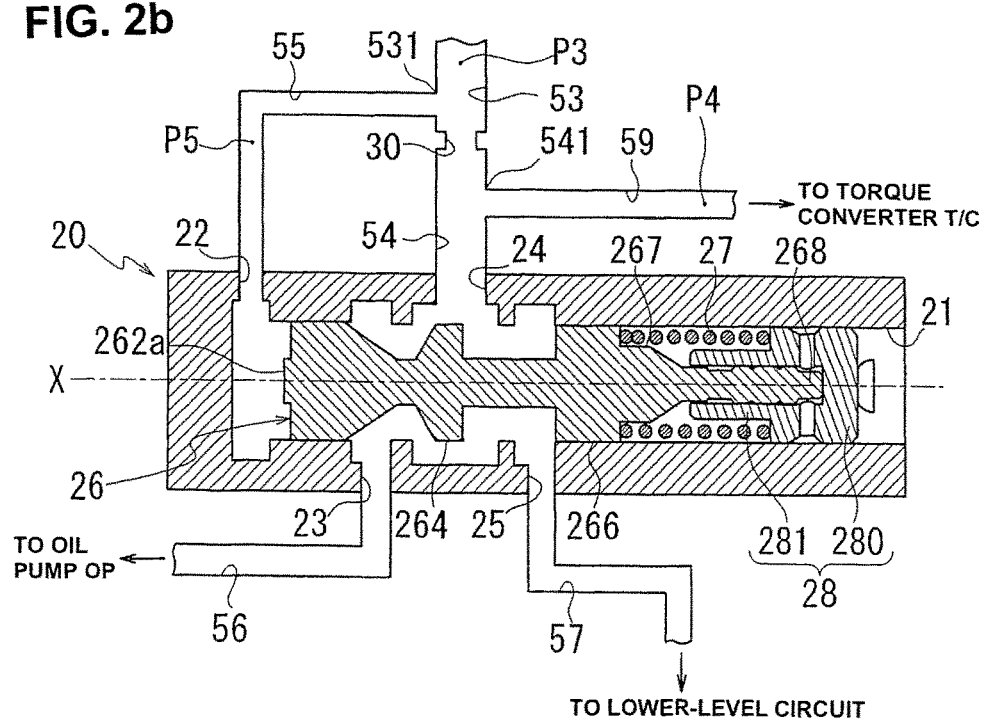

Referring to FIG. 2, there is shown the cross-sectional view illustrating the operation of pressure regulating valve 20. Hereupon, FIG. 2a is a sectional view illustrating a state where the spool 26 of pressure regulating valve 20 is displaced from the initial position to a position at which the input port 24 begins to communicate with the output port 25. FIG. 2b is a sectional view illustrating a state where the spool 26 of pressure regulating valve 20 is further displaced to another position at which the input port 24 and the output port 25 are brought into full fluid-communication with each other.

Figure 3:
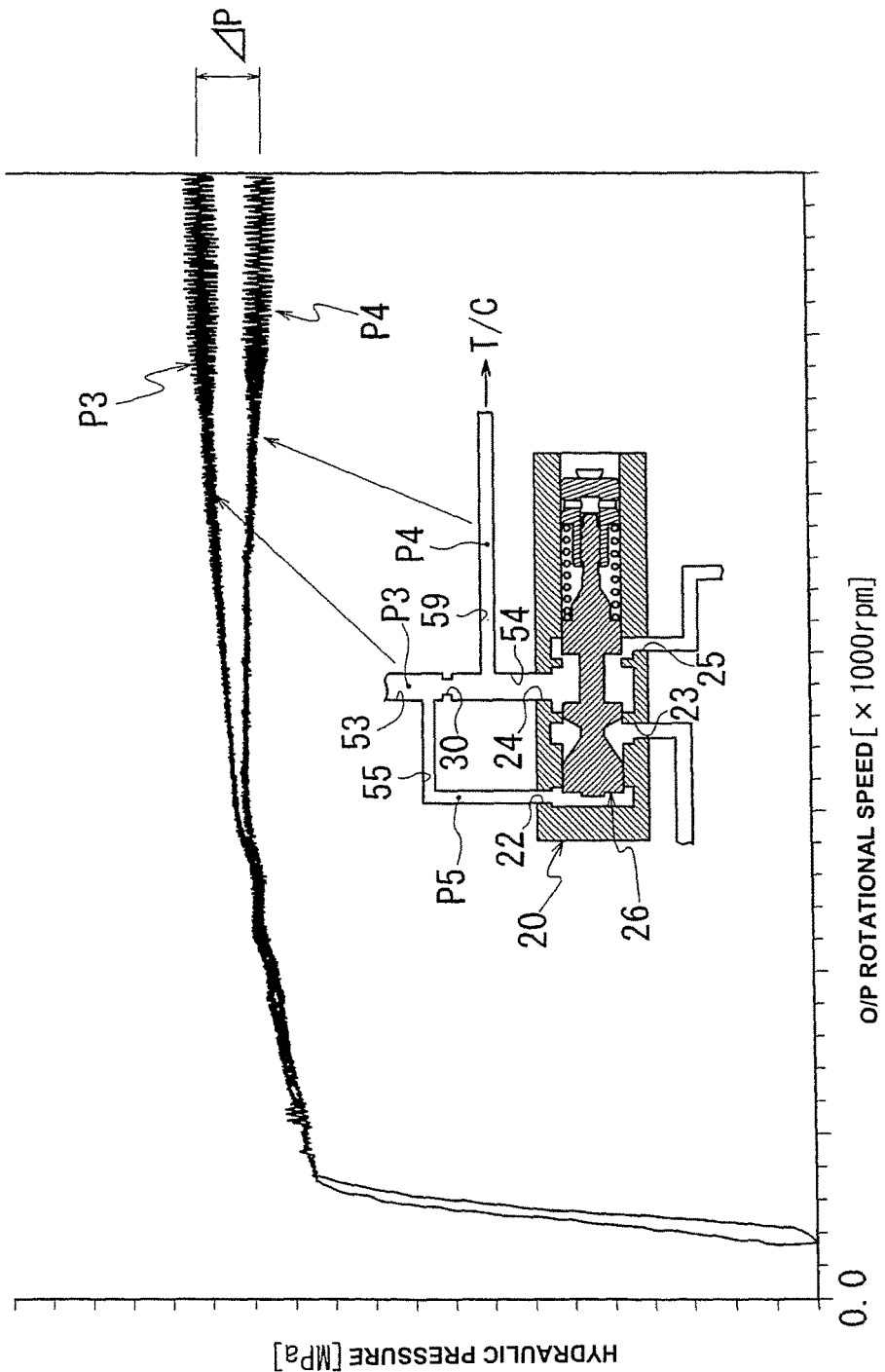
FIG. 3 is an explanatory drawing illustrating, in the hydraulic control circuit, the relationship among a rotational speed of an oil pump, a hydraulic pressure on the upstream side of a throttle provided in an oil passage, and a hydraulic pressure on the downstream side of the throttle.

Referring to FIG. 3, there is shown the explanatory drawing illustrating, in the hydraulic control circuit 1, the relationship among a rotational speed of oil pump OP, a hydraulic pressure (pilot pressure P3) on the upstream side of throttle 30, and a hydraulic pressure (torque converter pressure P4) on the downstream side of throttle 30.

In FIG. 3, the axis of abscissa indicates the rotational speed (unit: rpm) of oil pump OP, whereas the axis of ordinate indicates the hydraulic pressure (exactly, pilot pressure P3 and torque converter pressure P4) (unit: MPa). Additionally, in FIG. 3, the sectional view in and around the pressure regulating valve 20 is schematically indicated, and simultaneously hydraulic-pressure measurement points of the pressure regulating valve 20 and hydraulic-pressure measurement results at the measurement points are plotted according to the rotational speed of oil pump OP.

Figure 4:
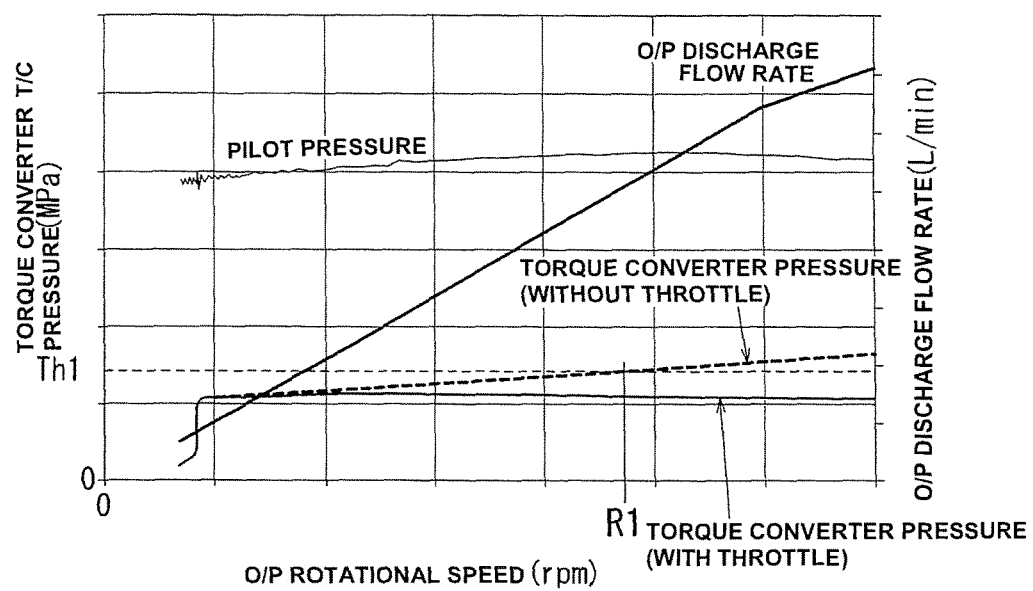
FIG. 4 is an explanatory drawing illustrating the relationship between a rotational speed of an oil pump and a torque converter pressure.
Figure 5A:
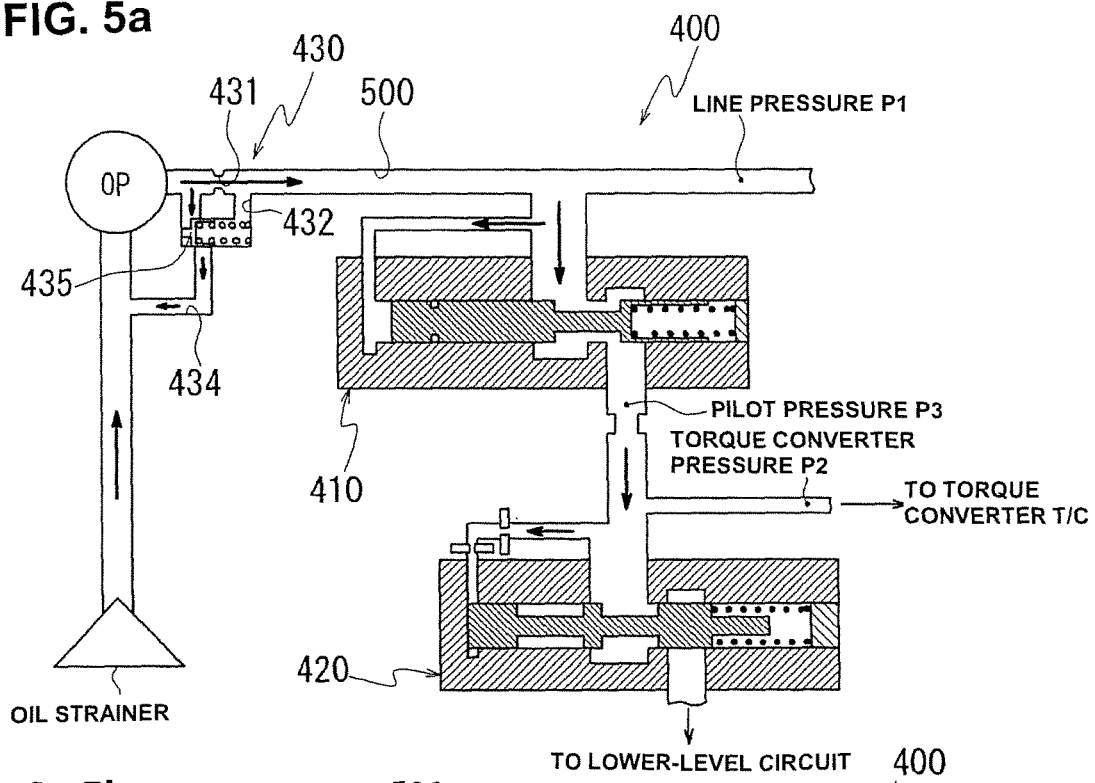
FIG. 5 is an explanatory drawing illustrating a hydraulic control circuit of a conventional example.
Figure 5B:
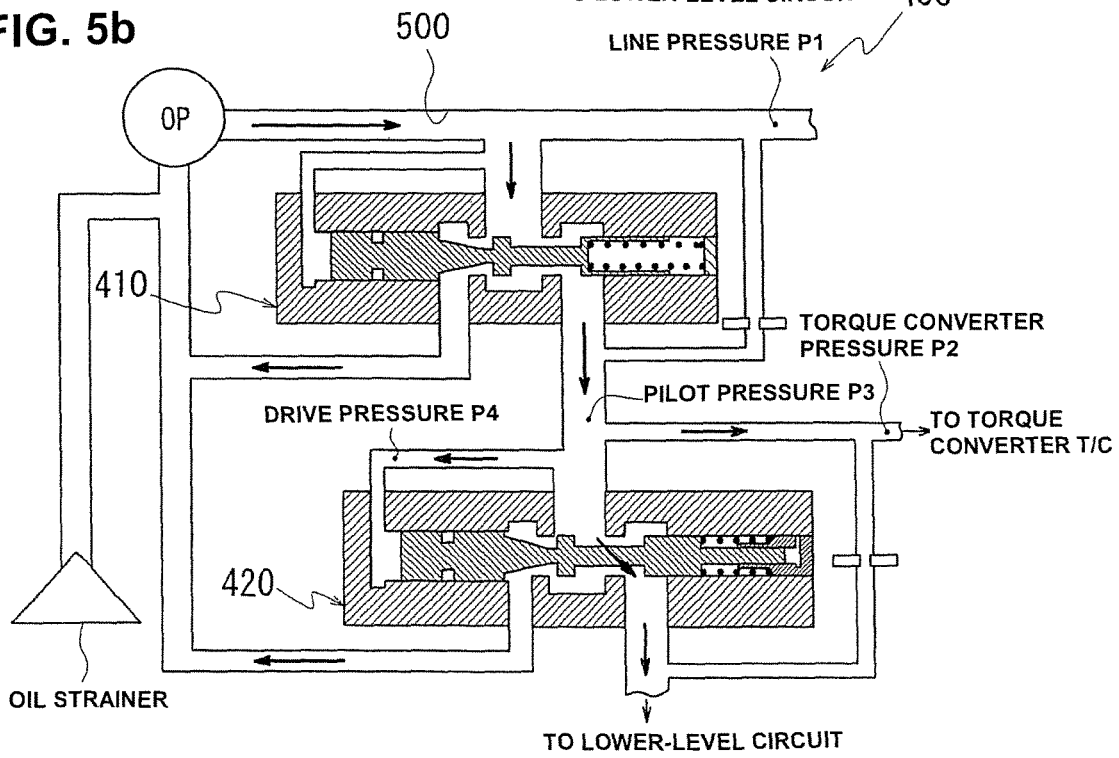

Referring to FIG. 4, there is shown the explanatory drawing illustrating the relationship between a rotational speed of oil pump OP and torque converter pressure P4, thereby comparing a change in torque converter pressure P4 in the circuit equipped with the throttle 30 with a change in torque converter pressure P4 in the non-throttle equipped circuit.

As shown in FIG. 1b, in a state where there is no supply of the output hydraulic pressure (pilot pressure P3) of pressure adjusting valve 10 to the oil passage 53, the spool 26 of pressure regulating valve 20 is positioned at its initial position at which the protruding portion 262a of the first large-diameter portion 262 has been brought into abutted-engagement with the wall section 21b.

In this state, the input port 24 of pressure regulating valve 20 is communicated with neither of the output port 25 and the exhaust port 23.

Under this state, when the output hydraulic pressure (pilot pressure P3) is supplied to the oil passage 53, the throttle 30, which is provided in the middle of the oil passage 535, serves as a flow resistance to the flow of oil. As a result of the provision of throttle 30, the hydraulic pressure in the oil passage 54 on the downstream side from the throttle 30 becomes lower than the hydraulic pressure (pilot pressure P3) in the oil passage 53 on the upstream side from the throttle 30.

Hereupon, pilot pressure P3 is directly supplied to the oil passage 55, which is connected to the oil passage 53 on the upstream side from the throttle 30, and thus the pilot pressure P3 supplied to the oil passage 55 directly acts on the first large-diameter portion 262 of spool 26 by way of the drive pressure port 22.

This pilot pressure P3 acts in the direction such that spool 26 moves toward the one end side (the right-hand side in the drawing). According to the magnitude of pilot pressure P3, spool 26 moves in the spool bore 21 toward the insertion opening 21a, while compressing the spring 27.

Hence, at the point of time when spool 26 has moved toward the insertion opening 21a by a given displacement, a clearance between the third large-diameter portion 266 and the output port 25 is produced (see FIG. 2a), and thus the input port 24 and the output port 25 are brought into fluid-communication with each other. Hence, the hydraulic pressure, which has a pressure value determined based on a displacement of spool 26, is supplied from the output port 25 of pressure regulating valve 20 to a lower-level circuit.

In this manner, with the provision of the throttle 30, the hydraulic pressure in the oil passage 54 on the downstream side from the throttle 30, which becomes lower than the pilot pressure P3, becomes further lowered by the amount of oil drained from the output port 25 of pressure regulating valve 20 (see FIG. 3).

Hereupon, in accordance with an increase in the displacement of spool 26 toward the insertion opening 21a, the opening area of the output port 25 of pressure regulating valve 20 increases. The drain amount of oil drained from the output port 25 of pressure regulating valve 20 is determined based on a displacement of spool 26. Accordingly, the hydraulic control circuit enables the hydraulic pressure (torque converter pressure P4) supplied to the input-side oil passage 59 of the torque converter T/C to be adjusted to a desired pressure (for instance, a pressure less than or equal to a threshold pressure value Th1 (see FIG. 4) that prescribes an upper limit of hydraulic pressure supplied to the torque converter side) by controlling or adjusting the displacement of spool 26 and by adjusting the drain amount of oil drained from the output port 25.

By the way, when the discharge pressure of oil pump OP becomes excessive, the output hydraulic pressure (pilot pressure P3) of pressure adjusting valve 10 also becomes excessive.

In such a case, even when the hydraulic control circuit is configured such that with the throttle 30 provided in the oil passage 53 the hydraulic pressure (torque converter pressure P4) in the oil passage 54 on the downstream side of throttle 30 becomes lower than the pilot pressure P3, torque converter pressure P4 also rises owing to a rise in pilot pressure P3 as discussed above (see FIG. 4).

Therefore, even when the drain amount of oil drained from the output port 25 is increased owing to the excessive pilot pressure, there is a possibility that the torque converter pressure P4 cannot be satisfactorily suppressed lower, because of a limit (an upper limit) to the drain amount from the output port 25.

For the reasons discussed above, in the pressure regulating valve 20, the width W (see FIG. 1a) of the second large-diameter portion 264 in the axial direction of axis X is set or dimensioned such that a clearance between the second large-diameter portion 264 and the exhaust port 23 can be produced depending on a displacement of spool 26 when the pilot pressure P3 has become excessive. Hence, when the pilot pressure P3 has become excessive, the hydraulic pressure, which has a pressure value determined based on a displacement of spool 26, is also exhausted from the exhaust port 23.

Therefore, even when the pilot pressure P3 has become excessive, it is possible to suppress the hydraulic pressure (the torque converter pressure) supplied to the torque converter side (not shown) to a pressure less than or equal to the threshold pressure value Th1 that prescribes an upper limit of hydraulic pressure supplied to the torque converter side.

Hence, even when the rotational speed of oil pump OP exceeds a rotational speed R1 (see FIG. 4) at which a torque converter pressure exceeds the threshold pressure value Th1 in a non-throttle equipped hydraulic control circuit of a comparative example, in the hydraulic control circuit 1 of the embodiment equipped with the throttle 30 the torque converter pressure P4 does not become excessive without exceeding the threshold pressure value Th1 (see FIG. 4).

Hereupon, the oil passage 56, which is connected to the exhaust port 23, is also connected to the oil passage 58 through which the oil pump OP is connected to the oil strainer (see FIG. 1a), and thus the hydraulic pressure exhausted from the exhaust port 23 is directly returned back to the oil pump OP.

By the adoption of the pressure regulating valve 20 constructed as discussed above, throttle 30 is provided between the connection section 541 of oil passages 54 and 53 both connected to the input port 24 of pressure regulating valve 20 and the connection section 531 of oil passages 55 and 53 both connected to the drive pressure port 22 of pressure regulating valve 20. Hence, the spool 26 of pressure regulating valve 20 can be operated by the pilot pressure P3 whose magnitude remains excessive.

Accordingly, it is possible to provide a pressure drop effect of both a drop of hydraulic pressure on the downstream side of throttle 30 by way of the throttle and a drop of hydraulic pressure resulting from an increase in the drain amount of oil drained from the output port 25. As a result of this, the torque converter pressure P4 on the downstream side of throttle 30 can be regulated lower than the pilot pressure P3 on the upstream side of throttle 30 (see the pressure difference ΔP shown in FIG. 3).

(1) As discussed above, a hydraulic control circuit 1 of the embodiment is provided with a pressure adjusting valve 10 (a first pressure regulating valve) for regulating a discharge pressure of an oil pump OP, a pressure regulating valve 20 (a second pressure regulating valve) for adjusting a pilot pressure P3 (an output hydraulic pressure) of the pressure adjusting valve 10 to a torque converter pressure P4 (a supply pressure) to an oil passage 59 (an input-side oil passage) of a torque converter (a hydraulic drive device) which is hydraulically controlled, and an oil passage 53 (a first oil passage) that connects an output port 15 of the pressure adjusting valve 10 and the oil passage 59, the pressure regulating valve 20 having an input port 24 connected to the oil passage 53 through an oil passage 54 (a second oil passage), a drive pressure port 22 (a drive port) connected to the oil passage 53 through an oil passage 55 (a third oil passage), a spool 26 (a valve element) axially displaced according to a drive pressure P5 inputted into the drive pressure port 22, and an output port 25, and the pressure regulating valve being configured to regulate the torque converter pressure P4 by controlling a flow rate between the input port 24 and the output port 25 by the spool 26 axially displaced according to the drive pressure P5 applied at the drive pressure port 22. A connection section 531 of the oil passage 53 and the oil passage 55 is provided on a side of the pressure adjusting valve 10 from a connection section 541 of the oil passage 53, the oil passage 54, and the oil passage 59, and a throttle 30 is provided in the oil passage 53 between the connection section 541 of the oil passage 53 and the oil passage 54 and the connection section 531 of the oil passage 53 and the oil passage 55.

With the previously-discussed configuration, the throttle 30, which is provided in the oil passage 53, serves as a resistance that results in a pressure loss in pilot pressure P3 flowing through the oil passage 53, and hence the hydraulic pressure in the oil passage 53 on the torque converter side from the throttle, that is, the hydraulic pressure (torque converter pressure P4) in the input-side oil passage 59 becomes lower than the hydraulic pressure (pilot pressure P3) in the oil passage 53 on the side of pressure adjusting valve 10.

Hence, by eliminating a flow control valve between the oil pump OP and the input port 14 of pressure adjusting valve 10, the discharge pressure (line pressure P2) of oil pump OP is directly applied at the input port 14 of pressure adjusting valve 10. As a result, even when the output hydraulic pressure (pilot pressure P3) from the output port 15 of pressure adjusting valve 10 becomes greater, it is possible to favorably effectively prevent the torque converter pressure P4 supplied to the input-side oil passage 59 of the torque converter from becoming excessive owing to the increased pilot pressure P3 of pressure adjusting valve 10.

(2) The pressure regulating valve 20 has an exhaust port 23 connected through an oil passage 56 (a fourth oil passage) to an oil passage 58 through which the oil pump OP is connected to an oil strainer (not shown), and the spool 26 has a structure that the input port 24 and the exhaust port 23 are brought into fluid-communication with each other, when the drive pressure P5 becomes greater than or equal to a predetermined pressure.

When the pilot pressure P3 of pressure adjusting valve 10 becomes excessive, the torque converter pressure P4 on the downstream side of throttle 30 also increases.

By the way, the drive pressure P5, which has been adjusted from the pilot pressure P3 of pressure adjusting valve 10, is applied at the drive pressure port 22 of pressure regulating valve 20. Hence, when the pilot pressure P3 of pressure adjusting valve 10 becomes excessive, the drive pressure P5, which is applied at the drive pressure port 22 of pressure regulating valve 20, also becomes excessive. As a result of this, the displacement of spool 26 also increases.

By virtue of the previously-discussed configuration, even when the drive pressure P5, which is applied at the drive pressure port 22 of pressure regulating valve 20, has become excessive, it is possible to return or relieve the torque converter pressure P4 downstream of the throttle 30, increased owing to the excessive pilot pressure P3 of pressure adjusting valve 10, from the exhaust port 23 back to the side of oil pump OP by bringing the input port 24 and the exhaust port 23 into fluid-communication with each other. Therefore, even when the pilot pressure P3 from the output port 15 of pressure adjusting valve 10 becomes greater, it is possible to favorably effectively prevent the torque converter pressure P4 supplied to the torque converter from becoming excessive owing to the increased pilot pressure P3 of pressure adjusting valve 10.

(3) The oil passage 59 of hydraulic control circuit 1 is configured or adapted to communicate with an oil passage connected to a torque-converter apply-pressure adjustment port (not shown).

With the aforementioned configuration, the torque converter pressure P4, which is adjusted to an appropriate pressure by means of the pressure regulating valve 20, is applied to the oil passage 59 connected to the apply-pressure adjustment port of the torque converter, and thus it is possible to prevent excessive hydraulic pressure from being applied to the torque converter.

Spool 26 is axially movably disposed in the bottomed cylindrical spool bore 21 formed in the valve body 10a.

Spool 26 is structured to have the first large-diameter portion 262, the first small-diameter portion 263, the second large-diameter portion 264, the second small-diameter portion 265, the third large-diameter portion 266, and the spring-guide portion 267, in that order, from its one end side. The spool is positioned at its initial position at which the first large-diameter portion 262 has been brought into abutted-engagement with the axial end of the spool bore 21 by a biasing force of the spring 27, which has been engaged with the spring-guide portion 267.

Each of the first large-diameter portion 262, the second large-diameter portion 264, and the third large-diameter portion 266 is configured or dimensioned to have an outside diameter conformable to the inside diameter of spool bore 21.

With the spool 26 positioned at its initial position, within the spool bore 21, the exhaust port 23, the input port 24, and the output port 25 are configured to open at respective positions conformable to the first small-diameter portion 263, the second small-diameter portion 265, and the third large-diameter portion 266.

With the aforementioned configuration, by the appropriate setting of the axial width of the second large-diameter portion 264, even when the drive pressure P5 applied at the drive pressure port 22 has become excessive, the input port 24 and the exhaust port 23 are brought into fluid-communication with each other, thereby permitting the torque converter pressure P4 downstream of the throttle 30, increased owing to the excessive pilot pressure P3 of pressure adjusting valve 10, to be returned or relieved from the exhaust port 23 back to the oil pump side.

The invention claimed is:

1. A hydraulic control circuit comprising:
   a first pressure regulating valve structured to regulate a discharge pressure of an oil pump;
   a second pressure regulating valve structured to regulate an output hydraulic pressure of the first pressure regulating valve to a supply pressure to an input-side oil passage of a hydraulic drive device which is hydraulically controlled;
   a first oil passage that connects an output port of the first pressure regulating valve and the input-side oil passage;
   said second pressure regulating valve including
      an input port connected to a connection section of the first oil passage and the input-side oil passage through a second oil passage;
      a drive port connected to the first oil passage through a third oil passage;
      a valve element axially displaced according to a drive pressure inputted into the drive port; and
      an output port; and
   said second pressure regulating valve being configured to regulate the supply pressure by controlling a flow rate between the input port and the output port of the second pressure regulating valve by the valve element axially displaced according to the drive pressure applied at the drive port,
   wherein a connection section of the first oil passage and the third oil passage is provided between the first pressure regulating valve and a connection section of the first oil passage and the second oil passage, and
   wherein a throttle is provided in the first oil passage between the connection section of the first oil passage and the second oil passage and the connection section of the first oil passage and the third oil passage.

2. The hydraulic control circuit as recited in claim 1, wherein:
   the second pressure regulating valve has an exhaust port connected through a fourth oil passage to an oil passage through which the oil pump is connected to an oil strainer; and
   the valve element has a structure such that the input port and the exhaust port are brought into fluid-communication with each other, when the drive pressure becomes greater than or equal to a predetermined pressure.

3. The hydraulic control circuit as recited in claim 1, wherein:
   the input-side oil passage of the hydraulic drive device is adapted to communicate with an oil passage connected to a torque-converter apply-pressure adjustment port.

4. The hydraulic control circuit as recited in claim 1, wherein the valve element comprises a spool.

* * * * *